US012277329B2

(12) United States Patent
Dai

(10) Patent No.: US 12,277,329 B2
(45) Date of Patent: Apr. 15, 2025

(54) METHOD AND SYSTEM FOR TRACKING MEMORY USAGE

(71) Applicant: Liping Dai, Anaheim, CA (US)

(72) Inventor: Liping Dai, Anaheim, CA (US)

(73) Assignee: LipingData Corporation, Anaheim, CA (US)

( * ) Notice: Subject to any disclaimer, the term of this patent is extended or adjusted under 35 U.S.C. 154(b) by 74 days.

(21) Appl. No.: 18/077,109

(22) Filed: Dec. 7, 2022

(65) Prior Publication Data

US 2024/0192872 A1 Jun. 13, 2024

(51) Int. Cl.
*G06F 3/06* (2006.01)

(52) U.S. Cl.
CPC ............ *G06F 3/064* (2013.01); *G06F 3/0619* (2013.01); *G06F 3/0656* (2013.01); *G06F 3/0679* (2013.01)

(58) Field of Classification Search
CPC ........ G06F 21/52; G06F 3/064; G06F 3/0619; G06F 3/0656; G06F 3/0679
See application file for complete search history.

(56) References Cited

U.S. PATENT DOCUMENTS

| | | | | |
|---|---|---|---|---|
| 5,784,699 A * | 7/1998 | McMahon | ............ | G06F 12/023 711/170 |
| 5,949,972 A * | 9/1999 | Applegate | ........... | G06F 11/3644 714/E11.2 |
| 6,832,302 B1 * | 12/2004 | Fetzer | ..................... | G06F 21/52 711/170 |
| 7,293,142 B1 * | 11/2007 | Xu | ....................... | G06F 12/0253 717/124 |
| 9,336,386 B1 * | 5/2016 | Qu | ....................... | H04L 63/1416 |
| 9,600,663 B2 * | 3/2017 | Christodorescu | ....... | G06F 21/52 |
| 2004/0221120 A1 * | 11/2004 | Abrashkevich | ....... | G06F 12/023 711/170 |
| 2006/0200677 A1 * | 9/2006 | Marinescu | .............. | G06F 21/52 713/182 |

(Continued)

OTHER PUBLICATIONS

Hastings R. "Purify: Fast Detection of Memory Leaks and Access Errors." Proceedings of the USENIX Winter '92 Conference (1992): 125-136. Print. (Year: 1992).*

(Continued)

*Primary Examiner* — Marina Lee
(74) *Attorney, Agent, or Firm* — Plager Schack LLP; Mark H. Plager, Esq.; Alexis J. Saenz, Esq.

(57) ABSTRACT

A method and system track memory allocation and release activities to detect memory leak, buffer overflow, and release type mismatch errors in a computing system. The memory tracker computes the necessary size of the allocated memory block and calls operating system provided functions to allocate and release raw memory blocks. Raw memory blocks are formatted into allocated memory blocks. An indexed data structure stores the allocated memory blocks. The user memory address is used as the index key value. The memory blocks are removed from the indexed data structure when the programs release the memory. The memory blocks remaining in the indexed data structure are considered memory leaks when the memory tracker terminates. The memory tracker adds bytes to the end of memory blocks for the integrity check and detects possible buffer overflow errors. Memory allocation type is added in the allocated memory blocks for release type mismatch errors.

18 Claims, 13 Drawing Sheets

(56) References Cited

U.S. PATENT DOCUMENTS

| | | |
|---|---|---|
| 2008/0028178 A1 | 1/2008 | Becker |
| 2008/0294853 A1 | 11/2008 | Kowlali et al. |
| 2020/0278937 A1 | 9/2020 | Durham et al. |
| 2022/0083464 A1* | 3/2022 | Kemisetti ............ G06F 12/0811 |
| 2022/0357875 A1* | 11/2022 | Bialek ................... G06F 3/0679 |
| 2023/0393769 A1* | 12/2023 | Durham .............. G06F 12/0875 |

OTHER PUBLICATIONS

International Search Report and Written Opinion issued on Jun. 27, 2023 in corresponding International Application No. PCT/US23/16235 (8 pages).

* cited by examiner

```
01  #define SOURCE_INFO __FILE__, __func__, __LINE__
02  #ifdef __cplusplus
03  template< class T >
04  T* LightCreateNewArray(size_t size, const char* fileName, const char* func, int line)
05  {
06      T* p = new T[size];
07      if (p) SetFileInfo(p, fileName, func, line);
08      return p;
09  }
10
11  template< class T >
12  T* LightCreateNewObject(const char* fileName, const char* func, int line)
13  {
14      T* p = new T;
15      if (p) SetFileInfo(p, fileName, func, line);
16      return p;
17  }
18
19  #ifdef _DEBUG
20      #define LNew(type)                              LightCreateNewObject<type>(SOURCE_INFO)
21      #define LNewArray(type, size)                   LightCreateNewArray<type>(size, SOURCE_INFO)
22  #else
23      #define LNew(type)                              new type
24      #define LNewArray(type, size)                   new type[size]
25  #endif
26
27
28  #ifdef _DEBUG
29      #define LMalloc(size)                           BLMalloc(size, SOURCE_INFO)
30      #define LRealloc(oldPtr, newSize)               BLRealloc(oldPtr, newSize, SOURCE_INFO)
31      #define LCalloc(numberOfElements, elementSize)  BLCalloc(numberOfElements, elementSize, SOURCE_INFO)
32  #else
33      #define LMalloc(size)                           malloc(size)
34      #define LRealloc(oldPtr, newSize)               realloc(oldPtr, newSize)
35      #define LCalloc(numberOfElements, elementSize)  calloc(numberOfElements, elementSize)
36  #endif
```

01  void* BLMalloc(size_t size,                              ← 701
02       const char* fileName, const char* func, int line)
03  {
04      unsigned char* p = malloc(size);
05      if (p) SetFileInfo(p, fileName, func, line);
06      return p;
07  }
08
09  void *BLRealloc(void* oldPtr, size_t newSize,            ← 702
10       const char* fileName, const char* func, int line)
11  {
12      unsigned char* p = realloc(oldPtr, newSize);
13      if (p) {
14          SetFileInfo(p, fileName, func, line);
15      }
16      else if (oldPtr) {
17          SetFileInfo(oldPtr, fileName, func, line);
18      }
19      return p;
20  }
21
22  void* BLCalloc(                                          ← 703
23       size_t numberOfElements, size_t elementSize,
24       const char* fileName, const char* func, int line)
25  {
26      unsigned char* p = NULL;
27      p = (unsigned char*)calloc(numberOfElements, elementSize);
28      if (p) {
29          SetFileInfo(p, fileName, func, line);
30      }
31      return p;
32  }
```

01  #define MemAllocType_vNone       0
02  #define MemAllocType_vCppArray   1
03  #define MemAllocType_vCppObject  2                      801
04  #define MemAllocType_vCStyle     3
05  #define MemAllocType_vOther      4
06
07  typedef unsigned short MemAllocType;
08  typedef void* MemTrackerHandle;
09
10  typedef struct LSourceInfo
11  {
12
13      const char* filePath;                               802
14      const char* func;
15      int line;
17  } LSourceInfo;
18
19  typedef void (*F_MemEvent)(
20      MemTrackerHandle memTracker, const LSourceInfo* sourceInfo,
21      void* memPtr, size_t size, const MemAllocType allocType);
22
23  typedef void (*F_MemReleaseTypeMismatchEvent)(           803
24      MemTrackerHandle memTracker, const LSourceInfo* sourceInfo,
25      void* memPtr, size_t size, const MemAllocType allocType,
26      const MemAllocType releaseType);
27
28  extern F_MemEvent gf_OnMemAlloc;
29  extern F_MemEvent gf_OnMemFree;
30  extern F_MemEvent gf_OnFindMemoryLeak;                   804
31  extern F_MemEvent gf_OnFindBufferOverflow;
32  extern F_MemReleaseTypeMismatchEvent gf_OnReleaseTypeMismatch;
```

FIG. 8

```
900
01  void OnMemAlloc(MemTrackerHandle  memTracker,
02      void* memPtr, const LSourceInfo* sourceInfo,
04      size_t size, const MemAllocType allocType)
05  {
06  }
07
08  void OnMemFree(
09      MemTrackerHandle  memTracker, const LSourceInfo* sourceInfo,
10      void* memPtr, size_t size, const MemAllocType allocType)
11  {
12  }
13
14  void OnFindMemoryLeak(
15      MemTrackerHandle memTracker, const LSourceInfo* sourceInfo,
16      void* memPtr, size_t size, const MemAllocType allocType)
17  {
18  }
19
20  void OnFindBufferOverflow(
21      MemTrackerHandle  memTracker, const LSourceInfo* sourceInfo,
22      void* memPtr, size_t size, const MemAllocType allocType)
23  {
24  }
25
26  void OnReleaseTypeMismatch(
27      MemTrackerHandle  memTracker, const LSourceInfo* sourceInfo,
28      void* memPtr, size_t size, const MemAllocType allocType,
29      const MemAllocType releaseType)
30  {
31  }
32
33  void SetMemoryTrackerEventHandlers(int switchOn)
34  {
35      gf_OnMemAlloc = switchOn ? OnMemAlloc : 0;
36      gf_OnMemFree = switchOn ? OnMemFree : 0;
37      gf_OnFindMemoryLeak = switchOn ? OnFindMemoryLeak : 0;
38      gf_OnFindBufferOverflow = switchOn ? OnFindBufferOverflow : 0;
39      gf_OnReleaseTypeMismatch = switchOn ? OnReleaseTypeMismatch : 0;
40  }
```

901 (lines 01-31), 902 (lines 33-40)

FIG. 9

```
1000
Main Memory | *** Error! The memory was allocated by: CPP new array[], but releasing by: free!, user pointer: 0x0000017DC7912A80,
Main Memory | TestMain.cpp(46), TestMain() : <<------ Memory allocation point.  ------
Main Memory | Memory Dump (size:64, ptr: 0x0000017DC7912A80) : address: 0x0000017DC7912A80, total bytes: 64, user bytes: 60
Main Memory |         0  1  2  3  4  5  6  7  8  9 10 11 12 13 14 15 16 17 18 19 20 21 22 23 24 25 26 27 28 29 30 31
Main Memory | --------------------------------------------------------------------------------------------------------
Main Memory | 000000: 00 00 00 00 00 00 00 00 00 00 00 00 00 00 00 00 00 00 00 00 00 00 00 00 00 00 00 00 00 00 00 00  ................................
Main Memory | 000032: 00 00 00 00 00 00 00 00 00 00 00 00 00 00 00 00 00 00 00 00 00 00 00 00 00 00 00 00             ............................
Main Memory | __end of memory dump__
Main Memory | *** Error! The memory block has buffer overflow! user pointer: [0x0000017DC7912A80].
Main Memory | *** Error! Buffer overflow.
Main Memory | Overflow user memory block bytes: 36. <<-------
Main Memory | TestMain.cpp(57), TestMain() : <<------ Memory allocation point ---
Main Memory | Overflow block corrupted tail: 0x0000017DC7912AA4 -> [04 02 -- -- ]
Main Memory | Corrupted Memory Block: address: 0x0000017DC7912A80, total bytes: 40, user bytes: 36
Main Memory |         0  1  2  3  4  5  6  7  8  9 10 11 12 13 14 15 16 17 18 19 20 21 22 23 24 25 26 27 28 29 30 31
Main Memory | --------------------------------------------------------------------------------------------------------
Main Memory | 000000: 31 32 33 34 35 36 37 38 39 3A 3B 3C 3D 3E 3F 40 41 42 43 44 45 46 47 48 49 4A 4B 4C 4D 4E 4F 50  123456789:;<=>?@ABCDEFGHIJKLMNOP
Main Memory | 000032: 51 52 53 54 04 02 -- --                                                                           QRST..?.
Main Memory | __end of memory dump__
Main Memory | *** Error! Memory leak is detected!!!
Main Memory | Total leaked user bytes: [50], leaked points: [1].
Main Memory | Memory Block List:
Main Memory | *** Leaked memory block [0]: total bytes: 54, address: 0x0000017DC79128C0, user block bytes: 50, <<-----
Main Memory | Memory Dump (size:54, ptr: 0x0000017DC79128C0) : address: 0x0000017DC79128C0, total bytes: 54, user bytes: 50
Main Memory |         0  1  2  3  4  5  6  7  8  9 10 11 12 13 14 15 16 17 18 19 20 21 22 23 24 25 26 27 28 29 30 31
Main Memory | --------------------------------------------------------------------------------------------------------
Main Memory | 000000: 00 00 00 00 00 00 00 00 00 00 00 00 00 00 00 00 00 00 00 00 00 00 00 00 00 00 00 00 00 00 00 00  ................................
Main Memory | 000032: 00 00 00 00 00 00 00 00 00 00 00 00 00 00 00 00 00 00 -- --                                      ..................
Main Memory | __end of memory dump__
Main Memory | - End of Memory Block List -
Main Memory | ----------------------------------------
Main Memory | MemAllocCount         :     1 <--
Main Memory | UsedMemBytes          :    50 <--
Main Memory | AllocatedMemBytes     :   436
Main Memory | MaxUsedMemBytes       : 12300
Main Memory | MaxAllocatedMemBytes  : 32080
Main Memory | TotalAllocCount       :    51
Main Memory | MaxMemAllocCount      :    56
Main Memory | ReservedAllocCount    :     0
Main Memory | ReservedMemBytes      :     0
System End.
```

METHOD AND SYSTEM FOR TRACKING MEMORY USAGE

CROSS-REFERENCE TO RELATED APPLICATIONS

None.

BACKGROUND

The embodiments herein relate generally to computer memory and more particularly to a method and system for tracking memory usage.

Memory (for example, Random Access Memory or RAM) is an important part of a computer system. The operating system that manages the general operation of a computer also manages the memory. The component or software module that manages the memory in the operating system is the Memory Allocator (through a process called memory allocation). The memory allocator provides memory allocation and release functions to user programs to use the shared memory blocks. C and C++ are two programming languages for creating software systems running in computers. Events such as buffer overflow, memory leak, and release type mismatch are common issues for C and C++ programs.

A memory leak for example, happens when a computer program allocated memory blocks and does not release them. Memory leaks can slow down or even crash the entire computing system.

A buffer overflow happens when a program uses memory space that exceeds the boundary value of the allocated memory block. This may cause the program to read data incorrectly or overwrite the content of other memory blocks. Buffer overflow may cause running systems to malfunction or crash.

In C and C++, memory allocation may conventionally be performed using the known "malloc( )", "realloc( )", "calloc( )", "new", and "new[ ]" functions/operators. The memory allocated by "malloc( )", "realloc( )", and "calloc( )" must be released by the "free( )" function/command. The memory allocated by "new[ ]" must be released by "delete[ ]" operator/function. The memory allocated by "new" must be released by "delete" operator/function. A memory release type mismatch happens when the wrong release method is used to release the memory. A mismatch may cause a system crash or a memory leak.

SUMMARY

A method and system for tracking memory allocation and release activities to detect memory leak, buffer overflow, and release type mismatch errors in a computing system. In one embodiment, the memory tracker implements the standard C and C++ memory allocation and release functions/operators to capture the user program requests. Upon the requested memory size, the memory tracker computes the necessary size of the allocated memory block, and calls the operating system/hosting system provided functions to allocate and release raw memory blocks. The memory tracker formats the raw memory block into an allocated memory block and uses an indexed data structure to keep all the allocated memory blocks. In one embodiment, a red-black tree is used as the indexed data structure and the user memory address is used as the index key value. The memory blocks are removed from the indexed data structure when the programs release the memory. The memory blocks remaining in the indexed data structure are considered as memory leaks when the memory tracker is terminating.

The memory tracker adds several bytes at the end of each user memory block for the allocated memory block integrity check and detect possible buffer overflow errors. The memory tracker adds a memory allocation type in the allocated memory block to report possible release type mismatch errors.

Five macros are defined to replace C and C++ memory allocate functions/operators, that include malloc, cmalloc, realloc, new, and new[ ]. The macros combine the memory allocation and set caller source file information two operations into one single logical programming line. Some event handlers are defined to allow user programs to create their own event handling programs to process memory allocate, release, buffer overflow, memory leak, and release type mismatch events.

BRIEF DESCRIPTION OF THE FIGURES

The detailed description of some embodiments of the invention is made below with reference to the accompanying figures, wherein like numerals represent corresponding parts of the figures.

FIG. 6 is a screenshot of a snippet of code that declares memory allocation macros according to embodiments of the subject technology.

FIG. 7 is a screenshot of a snippet of code that declares a BLMalloc( ) function, a BLRealloc( ) function, and a BLCalloc( ) function according to embodiments of the subject technology.

FIG. 8 is a screenshot of a snippet of code that declares memory tracker used data types according to embodiments of the subject technology.

FIG. 9 is a screenshot of a snippet of code that defines memory tracker event handlers according to embodiments of the subject technology.

FIG. 10 is a screenshot of a sample memory usage report according to embodiments of the subject technology.

DETAILED DESCRIPTION OF CERTAIN EMBODIMENTS

Embodiments of the subject disclosure use memory allocation functions in a programming language (for example, C and C++) to capture program requests. In some embodiments, the memory allocation functions may record the memory allocation caller's source file information. As will be appreciated, features in the subject system and process are fast and eliminate corner cases for memory leak errors to escape. Since some embodiments may be fast and small, a memory tracker of the subject disclosure can be integrated into, for example, C and C++ standard libraries to become a default feature of these two languages. It will be appreciated that C and C++ become safer languages to use after the integration of the instant technology. Embodiments keep track of memory allocation and release activities to report any memory leaks and release type mismatch errors. A feature also checks the integrity of the allocated memory block to report possible buffer overflow errors.

Figure 1:
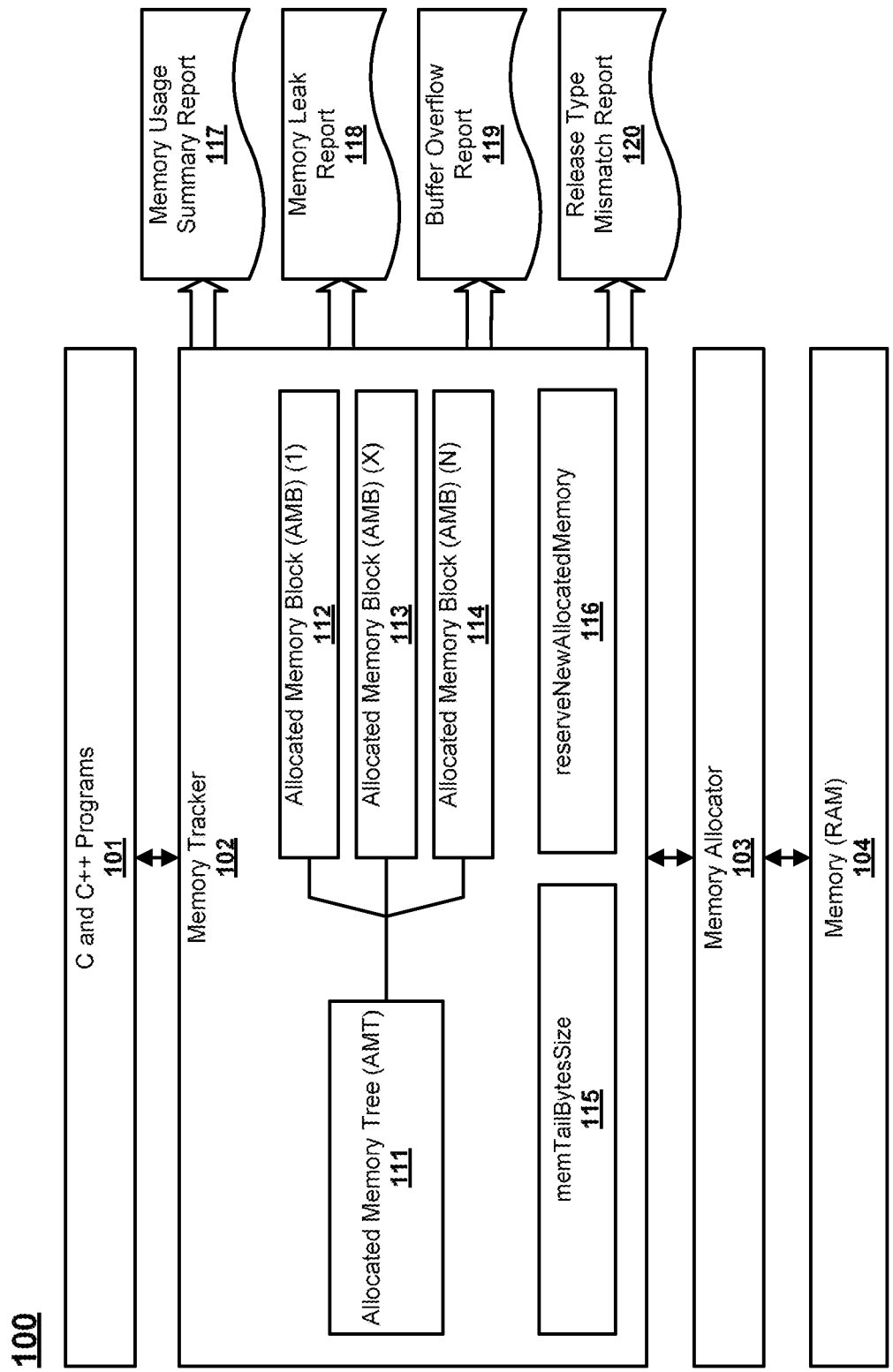
FIG. 1 is a block diagram of a system for tracking memory allocation activities in a software application according to an embodiment of the subject technology.

Referring now to FIG. 1, an overview of a system 100 is shown according to an embodiment of the subject technology. It includes the components in a computer system that relates to this innovation. The system 100 may include user programs (101), a memory tracker module (102), a memory allocator module (103), and memory (104). User programs (101) may be for example, C, C++, or other programs that call on the memory tracker module (102) provided functions to allocate and release memory blocks. The memory tracker module (102) is a software engine that implements the logic routines for tracking memory usage according to the subject technology. In some embodiments, the memory tracker module (102) includes an allocated memory tree module ("AMT") (111) to keep track of the location of allocated memory blocks 112, 113, and 114. The memory tracker module (102) may include in some embodiments, a memTailBytesSize (115) variable and reserveNewAllocatedMemory (116) variable. The memory allocator module (103) may be a memory allocator that the host system provided. The memory allocator module (103) manages the memory (RAM) 104 and provides the raw memory allocation and release functions to the memory tracker module (102). In some embodiments, the memory tracker module (102) generates a memory usage summary report (117), a memory leak report (118), a buffer overflow report (119), and a release type mismatch report (120).

In one embodiment, the memory tracker module (102) includes two deliverable files, one is a static library (LMemTracker.lib), another is a header file (LMemTracker.h). The static library (LMemTracker.lib) implements all the memory tracker logic and provides all the C and C++ memory allocate and release functions that includes malloc, realloc, calloc, free, new, delete, new[ ], and delete[ ]. The memory tracker is a C++ class that includes allocated memory tree (AMT) (111), memTailBytesSize, reserveNewAllocatedMemory, and a name. The class constructor initializes the memory tracker. The destructor terminates the memory tracker. The allocated memory block (AMB) and user memory block (UMB) are declared by C/C++ language structures.

There are three major functions created in the memory tracker module (102). The function AllocateMemory( ) is to implement the memory allocation workflow. The functions implementing malloc, calloc, new, and new[ ] call AllocateMemory( ) to complete the task. The function ReleaseMemory( ) is to implement the memory release workflow. The functions implementing free, delete, and delete[ ] call ReleaseMemory( ) to complete the task. The function ReallocMemory( ) is to utilize the memory allocate and free logics defined in the memory tracker and call host system provided re-allocate function to implement the logics that defined in C language realloc( ) function. It is a composite function. The realloc( ) function provided by the memory tracker calls ReallocMemory( ) to complete the task.

The header file (LMemTracker.h) should be included by the program that needs to use the memory allocation macros. The macro logic is illustrated in FIG. 6. The definitions should be part of the header file, additional definitions may need to be added for specific hosting platforms.

The memory tracker module (102) may provide all the C and C++ memory allocate and release functions or may only implement some of them as needed. The memory tracker module (102) may also create other memory allocation and release functions for the specific environment.

The indexed data structure for keeping allocated memory blocks (111) can be a red-black tree or other data structures, as long as it can quickly locate the memory blocks.

"memTailBytesSize" (115) can be replaced with a constant value if the memory tracker module (102) only uses a fixed tail bytes size.

The allocated memory block (AMB 211) and user memory block (UMB 212) can be combined as a single data structure which only needs one system memory allocation call to get the raw memory for both. In this case, the user memory pointer (203) can be removed because it can be calculated by the address of the tree node (205); but for simplicity and clarity, it is recommended to keep it. In case the underlying system provides different memory pools that can allocate memory blocks with different privileges or speed, separating the allocated memory block (211) and user memory block (212) may be a better choice.

The tail bytes of the user memory block (210) can be filled with a fixed bytes sequence or by an integrity check algorithm calculated bytes sequence. Fill by an integrity check algorithm is recommended, because any change to the tail bytes or the fields that participated in the calculation will cause the verification to fail. This will allow the memory tracker module (102) to report more possible errors. Additionally, a random value byte sequence that may be generated when the memory tracker starts can be added as one of the input items for the integrity bytes calculation. This will make it harder for malware to generate the valid tail bytes.

Figure 2:
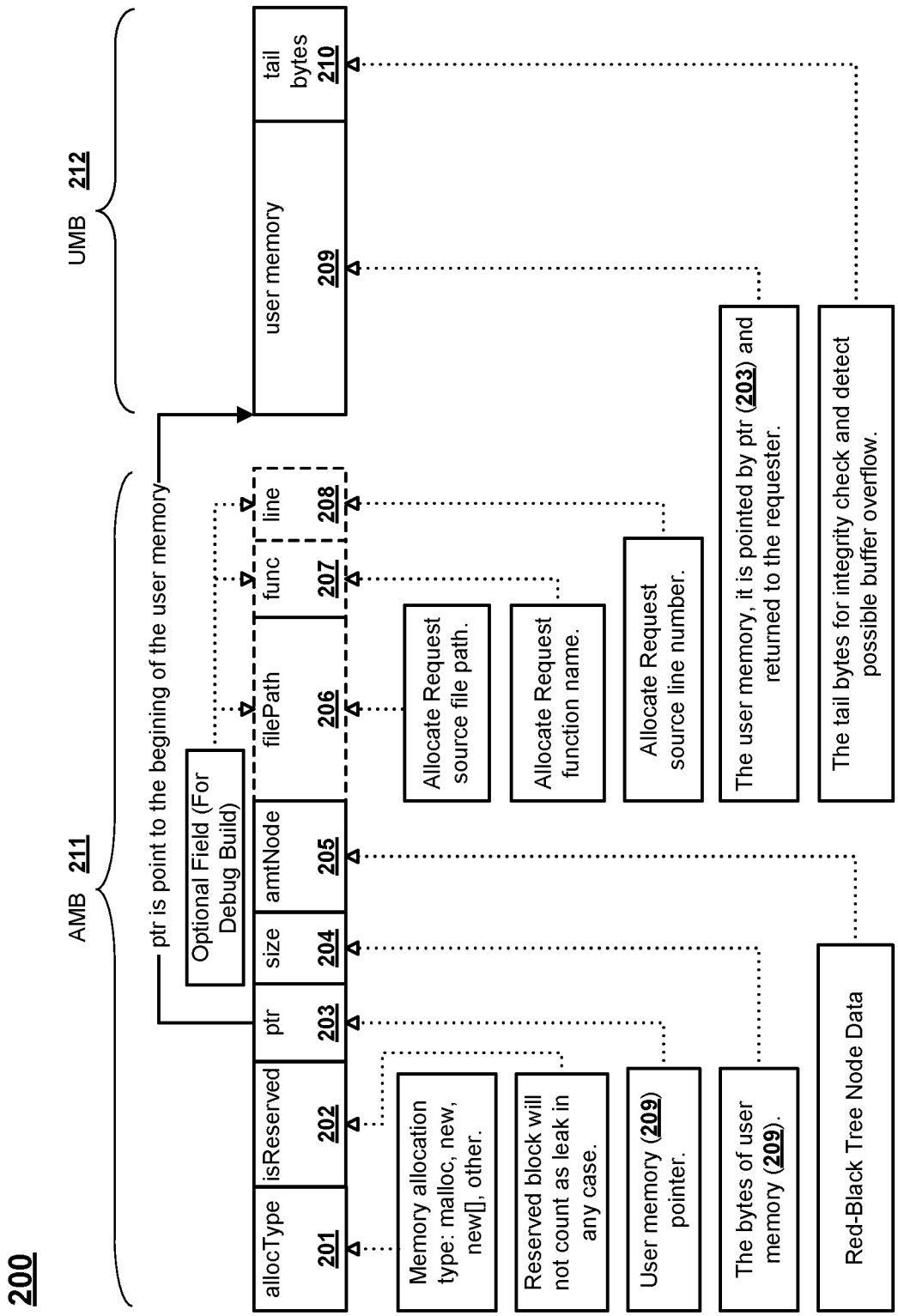
FIG. 2 is a block diagram illustrating the allocated memory block and user memory block data structures according to one embodiment of the invention.

FIG. 2 (with some reference back to structures in FIG. 1) shows an architecture 200 that defines an allocated memory block (AMB 211) and user memory block (UMB 212) data structures according to embodiments. At a high level, the AMB (211) includes components 201 to 208. UMB (212) includes components 209 and 210. The constituents of AMB (211) and UMB (212) will be described in detail below according to an example embodiment. Pointer ("ptr") 203 is a pointer in AMB (211) which points to the User Memory (209) in UMB (212). The allocated memory tree (111) is an indexed data structure which can store and quickly find allocated memory blocks (211). In one embodiment, a red-black tree is used for the indexed data structure. An AMB (211) is added into the AMT (111) when allocating memory and it is removed from AMT (111) when releasing the memory. At the time the memory tracker module (102) is shutting down, all the AMBs (211) should have been removed from AMT (111). The remaining AMBs (211) in AMT (111) when the memory tracker module (102) is shutting down may be considered memory leaks, except the isReserved (202) in the AMB (211) is set to true for some other purpose.

The following components from 201 to 208 may be included in an embodiment of the AMB (211):

A memory allocation type (allocType) (201) indicates the memory allocation function or operator requesting the program called (malloc, new, new[ ], or other). When allocating the memory, the request type is saved in memory allocation type (201). When releasing the memory, the release request type is compared with the value saved in memory allocation type (201). If they do not match, an allocate type mismatch report (120) may be generated in response to the mismatch.

Variable isReserved (202) indicates whether the memory block (AMB 211) is reserved or not. The reserved AMB will not count as a memory leak. In one embodiment, the memory tracker module (102) provides a function that takes a 1 or 0 input to switch the tracker's reserve value (116) to 1 or 0. The newly allocated AMB (211) may be reserved if the tracker's reserve value (116) is 1, otherwise the AMB is not reserved. This feature is particularly useful when the memory tracker module (102) is used in the operating system kernel, because some of the components in the operating system cannot be released otherwise the system will not be able to output memory tracking reports.

User memory pointer (203) points to the beginning of the user memory block (212). The pointer (203) may also return to the User Program (101). In one embodiment, the value is also used as the sorting key to sort all the AMBs (211) in AMT (111).

size (204) stores the user memory (209) size in bytes.

amtNode (205) is the node data for the indexed data structure. In one embodiment this is the red-black tree node which can be added in AMT (111).

filePath (206) is the memory for keeping the memory allocation function caller's source program file path. In one embodiment, it exists in debug versions but removed in release versions.

func (207) is the memory for keeping the memory allocation caller's source program function name. In one embodiment, it exists in debug versions but removed in release versions.

Line (208) is the source code line number that calls the memory allocation function. In one embodiment, it exists in debug versions but removed in release versions.

In an embodiment, the User Memory Block (212) includes components 209 and 210 that described below:

User memory (209) may be the memory allocated for the user program. It is pointed to by pointer (203) and returned to the memory allocation function caller.

Tail bytes (210) is the byte array at the end of user memory (209). It is used for an integrity check and for detecting possible buffer overflow errors. In one embodiment, the tail bytes (210) is a four-bytes array and each byte contains a different prime byte array value in the range from 131 to 251. The predefined byte array content is copied into the tail bytes (210) of all the UMBs (212). When releasing the memory, the memory tracker module (102) checks whether the tail bytes (210) content is changed. If it is changed, the memory tracker module (102) may generate a buffer overflow report (119).

In another embodiment, the tail bytes (210) are an four-bytes array which is filled with the first four bytes of the SHA1, SHA2, or CRC32 value bytes of the concatenated content of (allocType) (201), isReserved (202), ptr (203), size (204), and a four-bytes random byte array content which is generated when the memory tracker starts. When releasing the memory, the value bytes are calculated again and compared with the ones saved in tail bytes (210). If the values match, the integrity of the AMB (211) is verified; otherwise, a buffer overflow report (119) will be generated. This check actually verifies the integrity of the selected fields in the AMB (211) and the tail bytes (210). Any changes to these fields will cause the verification to fail. Since more and more systems have hardware accelerated SHA1, SHA2, CRC32, and other integrity check functions, using this dynamically calculated value for the tail bytes (210) is preferred. The tail bytes length (115) can be configured when the memory tracker module (102) starts. The longer the tail byte length, the more protection will be provided at the cost of consuming more memory. One recommended length is 4 bytes. There are many good algorithms for the tail bytes (210) calculation such as SHA1, SHA2, MD5, and CRC32. SHA1 and SHA2 are recommended.

Figure 3:
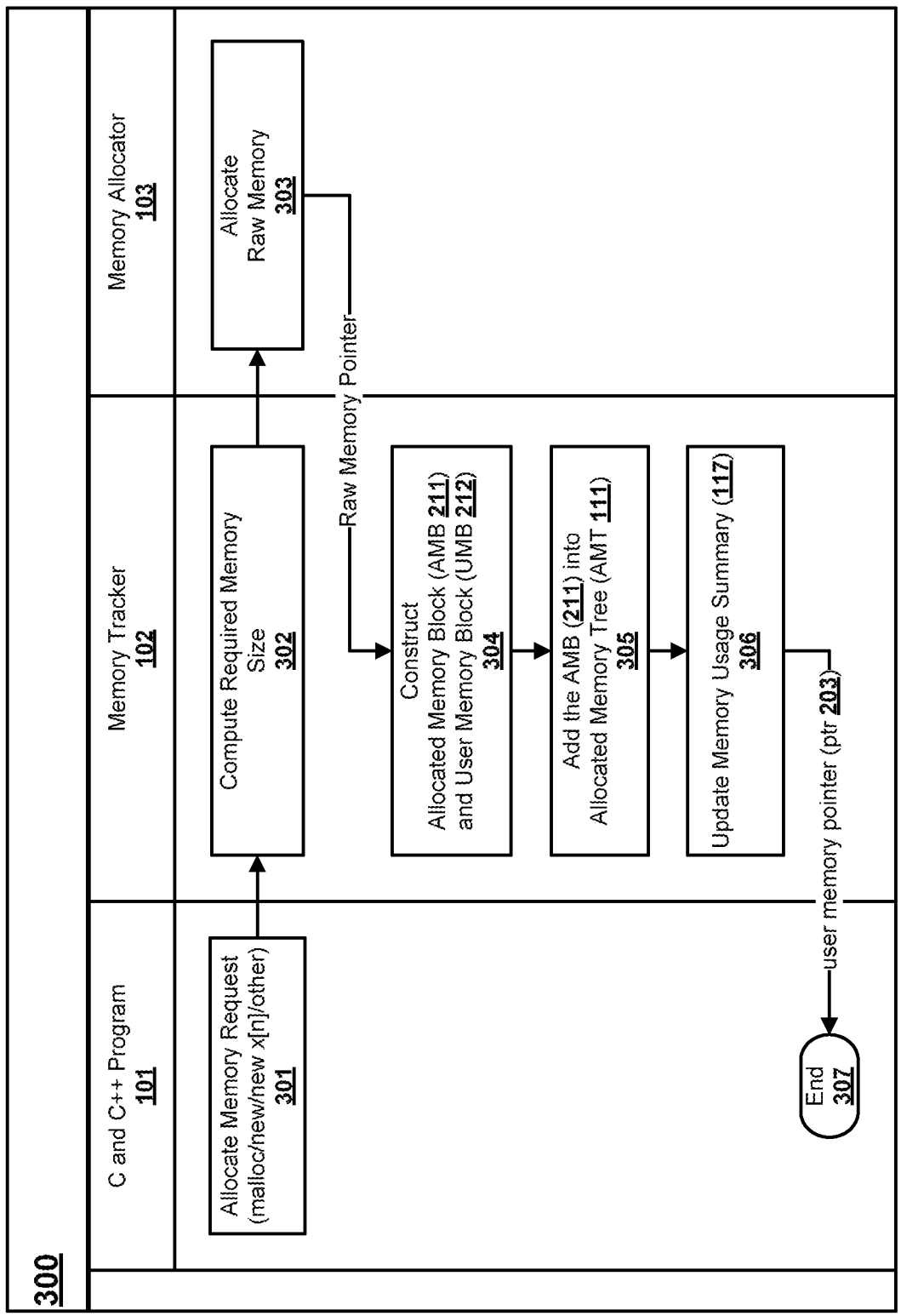
FIG. 3 is a flowchart of a method for memory allocation according to an embodiment of the subject technology.

A memory allocation process (300) (sometimes referred to in general as the "process (300)") is shown according to an embodiment in FIG. 3. The steps shown in FIG. 3 may sometimes refer back to elements in FIGS. 1 and 2. The process (300) is responsible for processing memory allocation requests. As an initial step, a user program (101) sends a memory allocation request (301) to the memory tracker module (102). Upon the requested memory size, the memory tracker module (102) computes (302) the required memory size for AMB (211) and UMB (212). The memory tracker module (102) makes a call to memory allocator (103) to allocate (303) raw memory. The memory tracker module (102) uses the raw memory to construct (304) the AMB (211) and UMB (212). The AMB (211) is added (305) into the AMT (111). The memory tracker module (102) may update (306) the memory usage summary (117) file. The memory tracker module (102) may return (307) the user memory pointer (203) to the User Program (101).

Figure 4A:
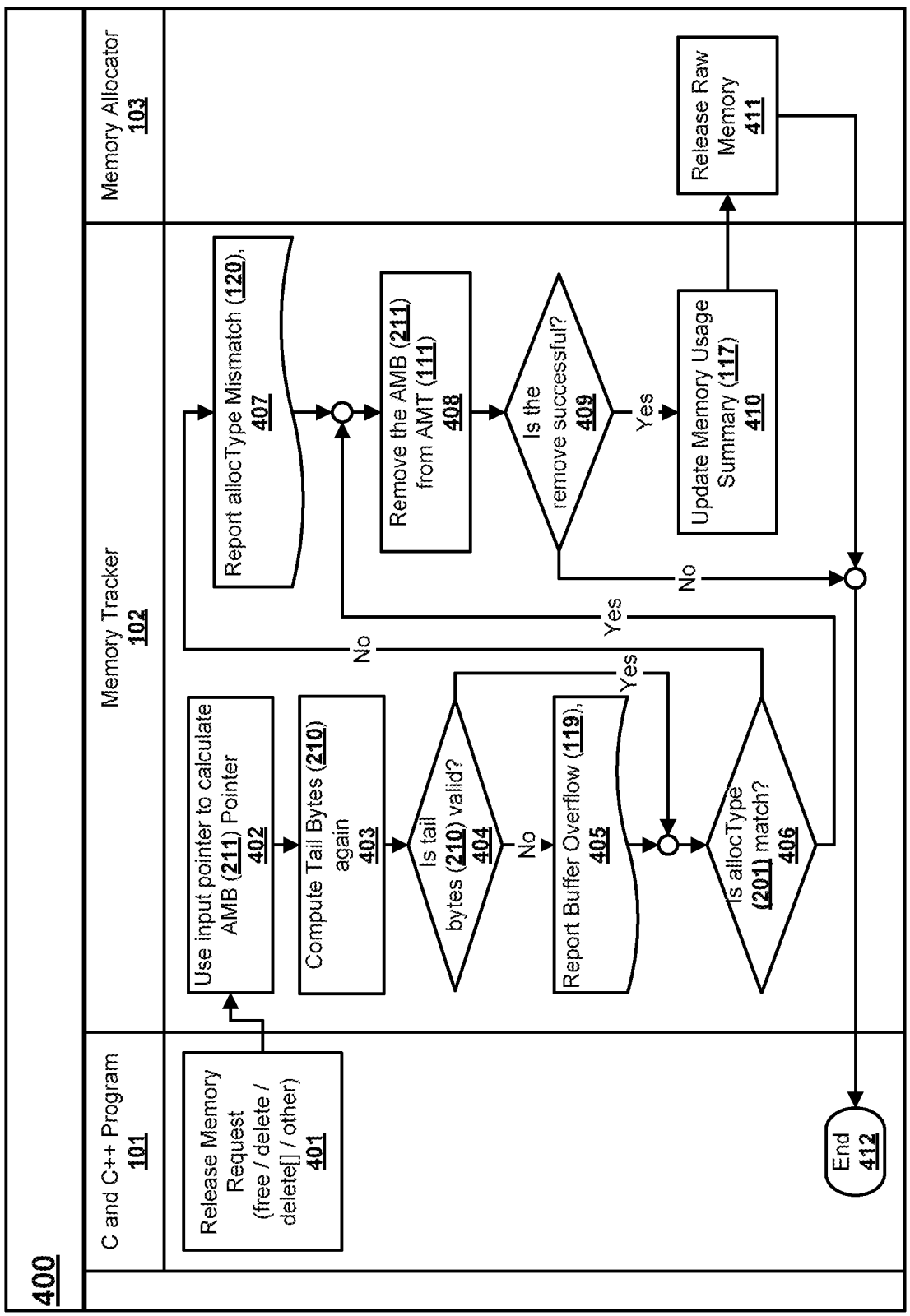
FIG. 4A is a flowchart of a method for releasing memory blocks in a computing device according to an embodiment of the subject technology.

A memory release process (400) (sometimes referred to in general as the "process (400)") is shown according to an embodiment in FIG. 4A. The process (400) is responsible for processing memory release requests. The steps shown in FIG. 4A may sometimes refer back to elements in FIGS. 1 and 2. The user program (101) may send (401) a memory release request to memory tracker module (102). The memory tracker module (102) may use the input pointer to calculate (402) the AMB (211) pointer. The memory tracker module (102) may compute (403) the tail bytes (210). The memory tracker module (102) may compare (404) the result of the computation in block (403) with the content saved in the tail bytes (210). If the compare result (404) is false, the process may generate (405) a buffer overflow report (119). The memory tracker module (102) may determine (406) whether the allocType (201) of the AMB (211) matches with the release type of the request. If the allocType (201) does not match the release type, a release type mismatch report (120) may be generated (407). The memory tracker module (102) may try to remove (408) the AMB (211) from the AMT (111). The memory tracker module (102) may check (409) whether the removal is successful. If successful, the memory tracker module (102) may update (410) the memory usage summary (117), otherwise the process may end (412). The memory tracker module (102) may call the memory allocator (103) provided memory release function to release (411) the raw memory. At block (412), the memory tracker module (102) may return the control to user program (101). The process 400 may be rearranged as long as the process includes: verifying the tail bytes, checking if the release type matches with the allocation type, removing an allocated memory block (AMB) from an allocated memory tree (AMT), releasing the raw memory, and calling a designated event handler when the event happens.

Figure 4B:
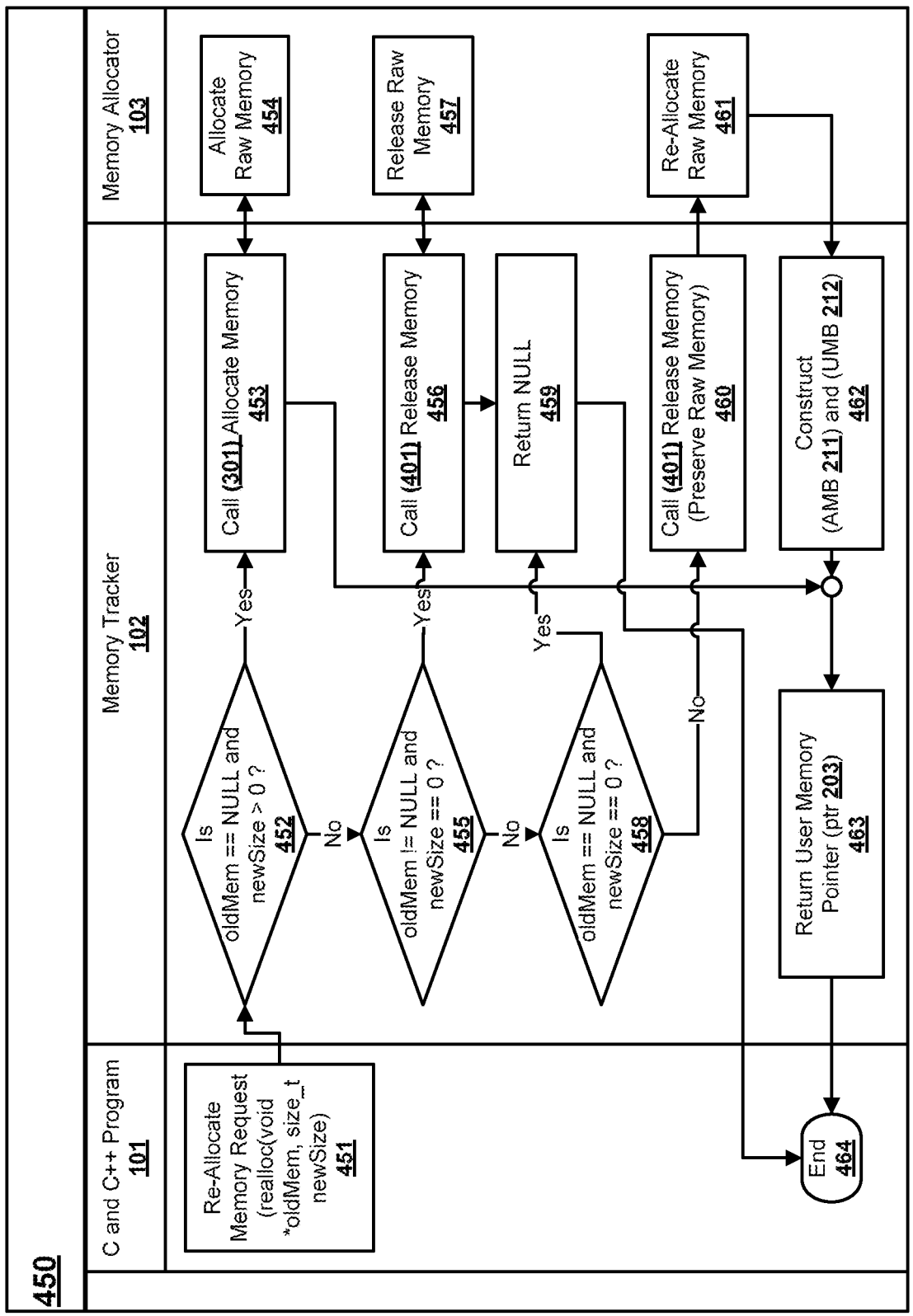
FIG. 4B is a flowchart of a method for re-allocating memory blocks in a computing device according to an embodiment of the subject technology.

Referring now to FIG. 4B, a process 450 for memory re-allocation is shown according to an embodiment. The process 450 is responsible for resizing an existing allocated memory block. The steps shown in FIG. 4B may sometimes refer back to elements in FIGS. 1 and 2. A user program (101) may send (451) a request to re-allocate memory to the memory tracker module (102). The memory tracker module (102) may determine (452) for the input parameters whether the existing memory pointer (oldMem) is empty (oldMem==NULL) and the requested new memory size (newSize) is not 0 (newSize>0). If both conditions are true, the memory tracker module (102) may issue (453) a call for a memory allocation request (301) to allocate the memory (which will call memory allocator (103) to allocate (454) the raw memory block). The memory tracker module (102) may return the user pointer (203) to the user program (101). If any of the conditions at block (452) is not satisfied, the memory tracker module (102) may determine (455) whether the existing memory pointer (oldMem) not empty (oldMem !=NULL) and the requested new memory size (newSize) is zero (newSize==0). If both conditions are satisfied, the memory tracker (102) issues (456) a call to release (401) memory (which will call memory allocator (103) to release the raw memory block). The memory tracker module (102) may return (459) NULL to the user program (101) and go to the end step 464. When any of the conditions at block (455) is not satisfied, the memory tracker module (102) may determine (458) whether the existing memory pointer (oldMem) is empty (oldMem==NULL) and requested new memory size (newSize) is zero (newSize==0). If both conditions are satisfied, the memory tracker module (102) may return a NULL value to the user program (101) and the process may end (464). If any of the conditions are not satisfied in 458, the memory tracker module (102) may call process (401) to release (460) the memory with the raw memory preserved, then call memory allocator (103) to re-allocate (461) the memory. The memory tracker module (102) may construct (462) the AMB (211) and UMB (212). The memory tracker module (102) may return (463) the user pointer (203) to the user program (101).

Figure 4C:
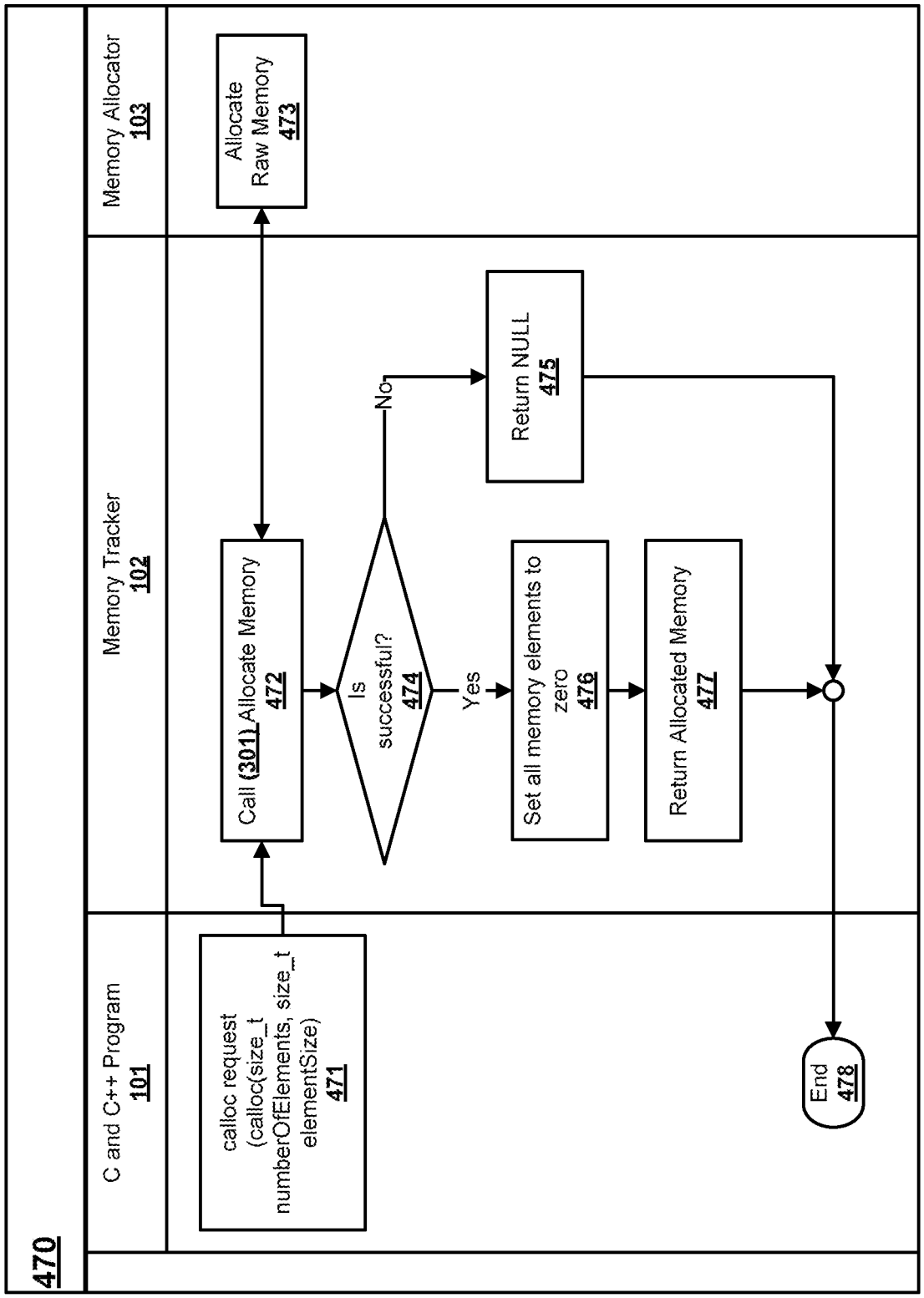
FIG. 4C is a flowchart of a method for implementing a "calloc( )" method in C language which sets the allocated memory values to 0 before returning the memory block pointer to the caller according to an embodiment of the subject technology.

Referring now to FIG. 4C, a process 470 for implementing C standard function calloc( ) is shown according to an embodiment. The steps shown in FIG. 4C may sometimes refer back to elements in FIGS. 1 and 2. The user program (101) may call calloc( ) to allocate memory (471). The memory tracker (102) may call function (301) to allocate memory and checks (474) the result. If the allocation is successful then set all the memory elements to zero (476) and return (477) the user memory pointer (203) to the user program (478), else return NULL (475) to the user program (478).

Figure 5:
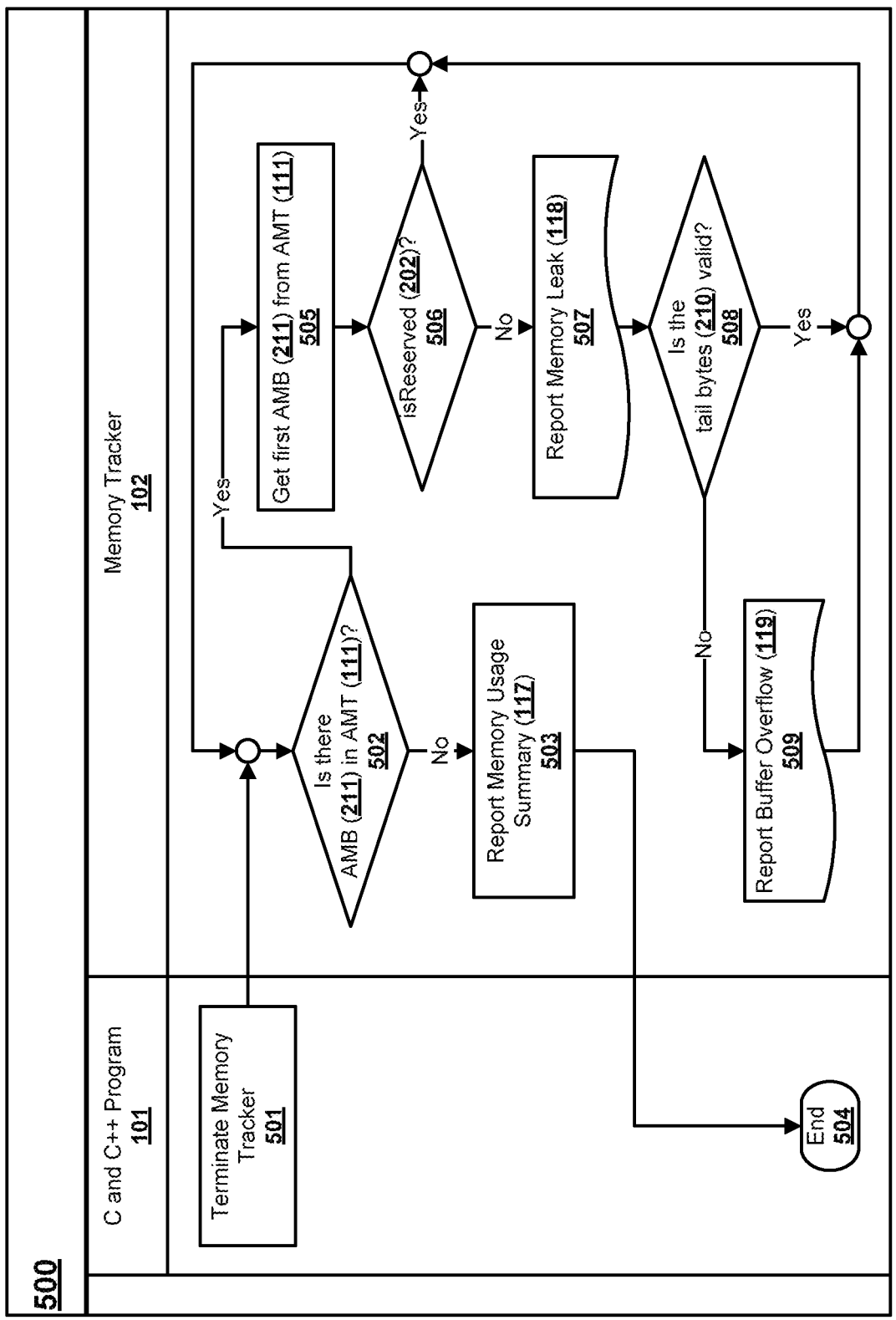
FIG. 5 is a flowchart of a method for terminating memory tracking in a computing device according to an embodiment of the subject technology.

Referring now to FIG. 5, a process 500 for terminating a memory tracker operation is shown according to an embodiment. The process 500 is responsible for terminating the operation of the memory tracker module (102). The steps shown in FIG. 5 may sometimes refer back to elements in FIGS. 1 and 2. The user program (101) may send (501) a request to terminate memory tracking to the memory tracker module (102). The memory tracker module (102) may check (502) if there is any AMB (211) in AMT (111). If no AMB (211) is present, the memory tracker module (102) may generate (503) the final memory usage summary report (117). The memory tracker module (102) may return (504) the control to user program (101). If an AMB (211) is present, the memory tracker module (102) may retrieve (505) the first AMB (211) in AMT (111). The memory tracker module (102) may check (506) if the isReserved (202) in the AMB (211) is true. If true, the process may return to (502) to continue the next check. If the isReserved is not true (or false), the memory tracker module (102) may generate (507) a memory leak report (118). The memory tracker module (102) may determine (508) if the tail bytes (210) in the UMB (212) is valid. If valid, the process may return to (502) to continue the next check. If the tail bytes are not valid, the memory tracker module (102) may generate (509) a buffer overflow report (119) and return to (502) to continue the next check.

The steps in process 500 may be re-arranged as long as the process includes: removing an allocated memory block from an allocated memory tree, reporting memory leaks for non-reserved blocks, checking the tail bytes for non-reserved blocks, reporting buffer overflow for non-reserved blocks with invalid tail bytes, and calling a certain event handler(s) when the event happens.

Referring now to FIG. 6, a screenshot 600 showing a snippet of code that declares memory allocation macros for embodiments of the subject memory tracking technology is provided. The example shown shows code written in C and C++ program languages. Example declarations 601-606 are shown. However, it will be understood that these are only some examples and other declaration types are contemplated within the scope of this disclosure.

The snippet shown declares five macros to combine the memory allocation and save caller source code information together. This code snippet illustrates how existing C and C++ features may be used to obtain the caller's source file information at compile time to make the error reporting fast and friendly. The left side column is the line number. The right side is the C and C++ code. Line 20 declared the macro LNew(type) (602) which is intended to replace the new operator in C++, the returned pointer needs to be released by C++ delete operator. Line 21 declared the macro LNewArray(type, size) (603) which is intended to replace C++ new [ ] operator; the returned pointer needs to be released by delete[ ] operator. Line 29 declared the macro LMalloc(size) (604) which is intended to replace the C malloc( ) function; the returned pointer needs to be released by free( ) function. Line 30 declared the macro LRealloc(oldPtr, newSize) (605), is intended to replace C realloc( ) function; the returned pointer needs to be released by free( ). Line 19 and 28 check if compile time switch _DEBUG is declared (601); if declared the macros will add the caller source file info, otherwise the source file info is dropped to reduce the system memory usage.

As may be appreciated, existing code and the third-party programs don't have access to the features the newly declared macros provide. The memory tracker module (102) of the present disclosure can still report memory leaks, buffer overflow, and release type mismatch errors regardless of the user program or any third party C and C++ program being used. When the macros are not used, the only thing missing in the error report is the allocation source file information. Being able to report the errors in existing code and third party C and C++ libraries is important because the third-party programs might be compiled binary library files, the source code may not be provided.

Referring now to FIG. 7, a screenshot 700 showing a snippet of code of the BLMalloc( ) function (701), BLRealloc( ) function (702), BLCalloc( ) (703) function. These functions are called by the elements 604, 605, and 606 in FIG. 6. The code can be put in a C file and included into a memory tracker project. The Function BLSetFileInfo( ) is called in 600 and 700. It simply copies the input values into the AMB fields.

Referring now to FIG. 8, a screenshot 800 showing a snippet of code that declares memory tracker used data types and event handlers according to an embodiment. The example shown shows code written in C and C++ program languages. The memory allocation types are declared in 801.

The memory allocation data type and source code information structure are defined in 802.

The memory tracker defined several event handlers that allow user programs to create their own event handling programs. The event handling programs are called when allocate memory, release memory, find memory leak, find buffer overflow, and find release type mismatch event happens. The event handler function pointer types are declared in 803. The event handler pointers are declared in 804.

Referring now to FIG. 9, a screenshot 900 showing a snippet of code that defines the memory tracker event handler functions according to an embodiment is provided. The example shown shows code written in C and C++ program languages. The empty event hander functions are defined in 901. The function SetMemoryTrackerEventHandlers( ) defined in 902 is to switch the event handlers on or off. The user programs can call the function to switch the handlers on (input 1) and off (input 0) at any time.

Referring now to FIG. 10, a screenshot 1000 shows a sample memory usage report according to an embodiment. Error report 1001 shows an example of release type mismatch report (120). Error report 1002 shows an example of a buffer overflow report (119). 1003 shows an example of memory allocation point in the user program; the allocated memory has buffer over overflow error which reported at 1002. Error report 1004 shows an example of a memory leak report (118). 1005 shows an example of a memory usage summary report (117).

Examples of items included in the memory usage summary are shown below. In one embodiment, it included the following items.

```
--------------------------------------------------------------------------------
Symbol                  | Description
--------------------+-----------------------------------------------------------
MemAllocCount           | The count of the non-reserved AMBs in the AMT.
UsedMemBytes            | The sum of user memory bytes in non-reserved AMBs.
AllocatedMemBytes       | The sum of all AMB and UMB bytes in non-reserved AMBs.
MaxUsedMemBytes         | The maximum sum of user memory bytes in non-reserved AMBs.
MaxAllocatedMemBytes    | The maximum sum of bytes of AMB and UMB in non-reserved AMBs.
MaxMemAllocCount        | The maximum count of non-reserved AMBs.
TotalAllocCount         | The count of all the memory allocation requests.
ReservedAllocCount      | The count of the reserved AMBs in the AMT.
ReservedMemBytes        | The sum bytes of user memory in reserved AMBs.
```

The processes described above may be implemented in a memory tracker module (102) (See FIG. 1) in one embodiment. The memory tracker module (102) may provide the standard C and C++ memory allocation and release functions to capture the user program's requests. The provided functions are: new, new[ ], delete, delete[ ], malloc, realloc, calloc, and free. The logic of new, new[ ], and malloc is described in FIG. 3. The logic of free, delete, and delete[ ] are described in FIG. 4A. The logic of realloc is described in FIG. 4B. The logic of calloc is described in FIG. 4C.

The memory tracker calls operating system provided functions to allocate and release raw memory blocks. An indexed data structure is used to keep all the allocated memory blocks. The memory blocks are removed from the indexed data structure when the programs release the memory. All the memory blocks may have been removed from the indexed data structure before the memory tracker terminates. The memory blocks remaining in the indexed data structure are considered as memory leaks when the memory tracker is shut down, except for any memory block marked as reserved.

The memory tracker of the subject disclosure adds several bytes (tail bytes) at the end of each user memory block to detect possible buffer overflow errors. The tail bytes (210) (See FIG. 2) are either filled with a constant byte sequence or the value bytes calculated by a selected integrity check algorithm. When releasing the memory, the byte values are calculated again with the same algorithm. The result is compared with the ones saved in the tail bytes (210). If they are not the same, the memory tracker module (102) will generate a buffer overflow report (119) (See FIG. 1).

The memory allocation type (201) saved in the allocated memory block (211) is checked when processing the memory release requests. If the release type doesn't match with the allocation type, the memory tracker will generate release type mismatch report (120).

The sequence of the items in an allocated memory block (211) may be rearranged as desired. However, when an accidental buffer overflow happens, the key field amtNode (205) shall have more space in the front for protection, which should be kept in mind when arranging the items in the AMB.

Common channels for reporting the memory tracker events are: log file, C and C++ standard output, and IDE debug output. Also, the user program can create its own reporting method in the memory tracker event handlers.

The memory tracker module (102) may be used in an operating system kernel, service application (daemon), or regular applications. For most of the service applications and regular applications, the memory tracker instance can be declared as a global variable which will be loaded into the application's stack memory and initialized automatically when the application starts. Also, the memory tracker's destructor will be called automatically to terminate the memory tracker when the application ends. There are three steps to use the memory tracker module (102) in this case:

Include the memory tracker header file (LMemTracker.h) in the C and C++ source files that need to use the memory allocation macros. No change is needed for the C and C++ source files that don't use the macros.

Declare a global variable for the memory tracker class.

Link the user program with the memory tracker library.

When the memory tracker module (102) is used in an operating system kernel or some special applications, the system may need to control the startup and shutdown steps precisely. Declaring the memory tracker instance as a global variable will not be a choice in this case. The memory tracker module (102) may need to combine with the memory allocator and be created at a designated memory address. Also, the memory tracker module (102) may need to be created after initializing some essential system components such as the memory controller. When the system is shutting down, the place for terminating the memory tracker module (102) is also critical. The system may need to ensure there is no memory allocate and release activities after the memory track is terminated.

Some computing devices have multiple memory pools. Each memory pool may have a different speed and cost. The memory tracker module (102) is capable of creating multiple instances. Each instance can provide the tracking features for one memory pool. The C and C++ standard memory allocation and release functions work with the main memory pool. The user programs can access the other memory pools by the memory tracker provided AllocateMemory( ) and ReleaseMemory( ) functions which can still report memory leak and buffer overflow errors.

Figure 11:
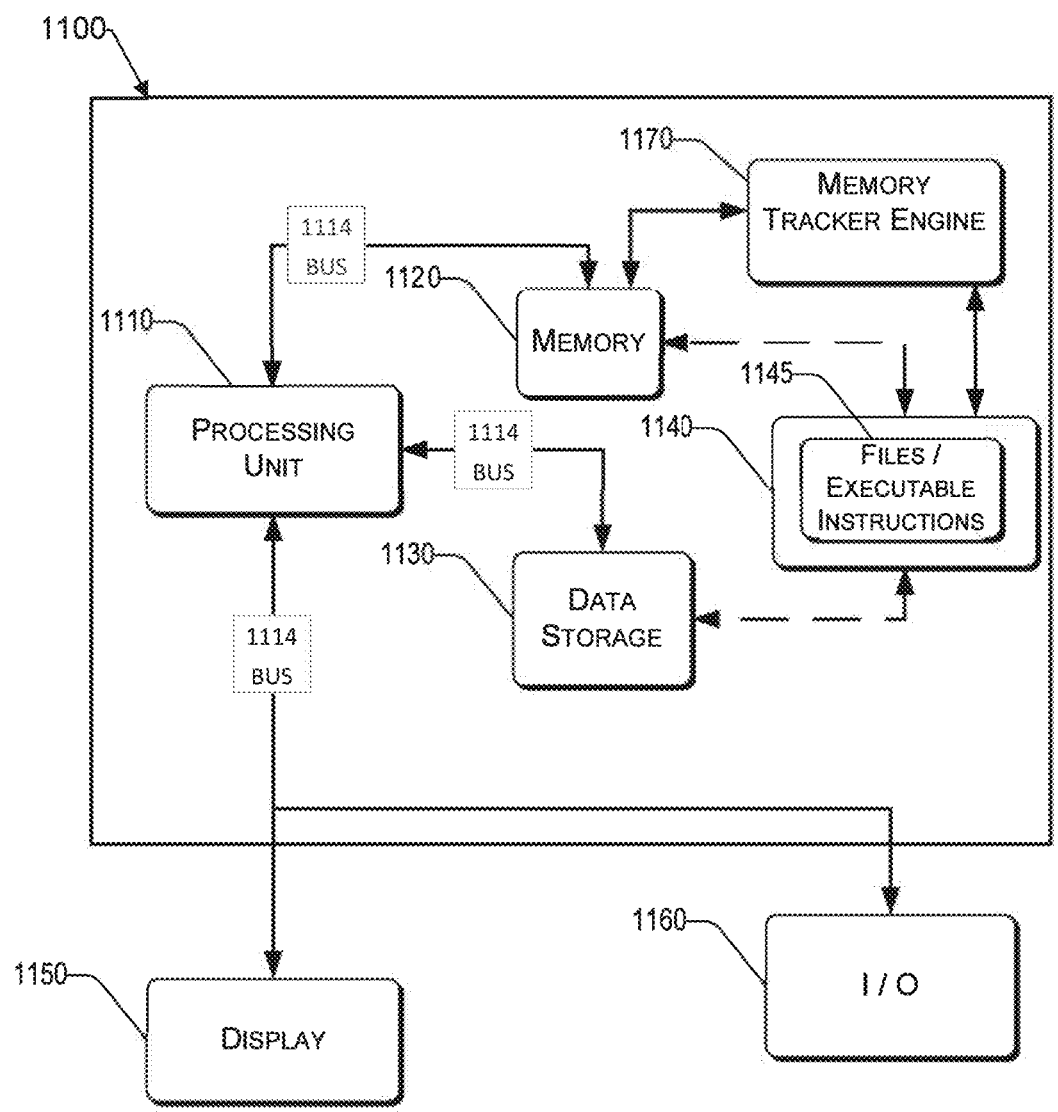
FIG. 11 is a block diagram of a computing device for implementing embodiments of the subject disclosure.

Referring now to FIG. 11, a computing device 1100 is shown in detail according to an exemplary embodiment. The computing device 1100 may be for example, a mobile phone or a computer server running a program that can benefit from memory tracking features of the subject disclosure. In the role of a user device, the computing device 1100 is generally a server, desktop computers, tablet or laptop computers, all-in-one computer stations, a mobile computing device (for example, a smart phone, smart wearable devices (glasses, jewelry, watches, ear wear, etc.), or programmable electronics).

The components of the computing device 1100, may include, but are not limited to, one or more processors or processing units 1110, a system memory 1120 (for example RAM or other hardware memory device), data storage 1130, a computer program product 1140 having a set of program modules 1145 including files and executable instructions, and a bus system 1114 that couples various system components including the system memory 1120 to the processor(s) 1110. Embodiments generally include a memory tracker engine 1170 that includes executable files running the processes described above with respect to the memory tracker module 102. The computer program product 1140 may be hardware (for example, memory elements storing a software implementation of the embodiments described above) or a software embodiment running the memory tracking processes. The memory tracker engine 1170 may be a separate component or integrated into the computer program product 1140. The set of program modules 1145 includes the instructions for performing the processes described above related to memory tracking and alerts that are provided.

In some embodiments, the processing units 1110 are dedicated computer processors which implement the processes described above, including for example, memory tracking and error detection.

The computing device 1100 may be described in the general context of computer system executable instructions, such as the program modules 1145 which represent a software embodiment of the system and processes described generally above. The program modules 1145 generally carry out the functions and/or methodologies of embodiments as described above. The computing device 1100 may typically include a variety of computer system readable media. Such media could be chosen from any available media that is accessible by the computing device 1100 including non-transitory, volatile and non-volatile media, removable and non-removable media for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing. The system memory 1120 could include one or more computer system readable media in the form of volatile memory, such as a random-access memory (RAM) and/or a cache memory. By way of example only, the data storage system 1130 may read from and write to a non-removable, non-volatile magnetic media device. The system memory 1120 may include at least one program product 1140 having a set of program modules 1145 that are configured to carry out the functions of embodiments of the invention in the form of computer executable instructions. The program product/utility 1140, having a set of program modules 1145, may be stored in the system memory 1120 by way of example, and not limitation, as an operating system, one or more application programs, other program modules, and program data. Some embodiments may generate an electronic user interface (viewable and controllable from a display 1150) that may allow the user to enter image objects for processing.

The computing device 1100 may communicate with one or more external devices including for example, an electronic display 1150 which may in some embodiments be configured for tactile response as in a touch screen display. User input into the display 1150 may be registered at the processor 1110 and processed accordingly. Other devices may enable the computing device 1100 to communicate with one or more other computing devices, either by hardwire or wirelessly. Such communication can occur via Input/Output (I/O) interfaces/ports 1160. In some embodiments, the I/O interfaces/ports 1160 may be specially configured to handle aspects of the embodiments described herein converting the computing device 1100 into a special purpose machine. For example, as a processing point, the I/O interfaces/ports 1160 may be configured to transmit messages related to memory allocation and memory block changes that occur externally from the computing device 1100 (for example, in a network setting) so that sources or memory allocation error can be detected outside of the computing device 1100 that affect the memory allocation tracking that occurs inside the computing device 1100.

The computing device 1100, through the I/O interface/ports 1160, may communicate with one or more networks such as a local area network (LAN), a general wide area network (WAN), and/or a public network (e.g., the Internet) via a network adapter as is commonly known in the art. Each of the operating system, one or more application programs, other program modules, and program data or some combination thereof, may include an implementation of a networking environment. In some embodiments, the computing device 1100 may be a cloud computing node connected to a cloud computing network (not shown). The computer computing device 1100 may be practiced in distributed cloud computing environments where tasks are performed by remote processing devices that are linked through a communications network. In a distributed cloud computing environment, program modules may be located in both local and remote computer system storage media including memory storage devices.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "module", "circuit", or "system." For example, a "memory module" may in some hardware embodiments be any one of the system memory 1120, the data storage 1130 or any combination thereof. Furthermore, aspects of the disclosed invention may take the form of a computer program product embodied in one or more computer readable media having computer readable program code embodied thereon.

Aspects of the disclosed invention are described above with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor 1110 of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks in the figures.

Those of skill in the art would appreciate that various components and blocks may be arranged differently (e.g., arranged in a different order, or partitioned in a different way) all without departing from the scope of the subject technology. The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

Thus, the claims are not intended to be limited to the aspects shown herein, but are to be accorded the full scope consistent with the language of claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such an aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method for tracking memory allocation and release activities by a memory tracker to detect memory leak, buffer overflow, and release type mismatch errors in a computing system, comprising:
   generating a first data structure, Allocated Memory Block (AMB), for each of a plurality of respective user pointers, wherein each AMB includes its respective user pointer, a user memory size, an allocation type, and a node data which supports adding the AMB into an indexed data structure;
   generating a second data structure, the indexed data structure as an allocated memory tree (AMT), configured to track each allocated memory block (AMB), wherein each allocated memory block is locatable by a memory pointer returned to a caller program;
   generating a third data structure, a User Memory Block (UMB) for each AMB, wherein the UMB includes the user memory size and a tail byte array of tail bytes, and wherein the tail byte array includes a calculated bytes sequence to provide integrity checking and detecting a buffer overflow;
   providing, by an underly operating system or hosting system, a plurality of memory allocate and release functions and operators that include: malloc, realloc, calloc, free, new, delete, new[ ], and delete[ ] to capture a memory allocation and release request;
   allocating and releasing raw blocks of memory based on the plurality of memory allocate and release functions provided by the underly operating system or hosting system; and
   verifying a content of the calculated bytes sequence in the UMB during the releasing blocks of memory.

2. The method of claim 1, wherein the AMT is a red-black tree to track all the AMBs, wherein the AMT is indexed by the user pointer in each AMB and the node data in the AMB is a red-black tree node data.

3. The method of claim 1, further comprising:
   copying a fixed sequence of prime byte array values into the tail bytes of every UMB;
   performing a buffer overflow verification method that includes comparing a content of the tail bytes with the fixed byte sequence;
   returning a false value if the tail bytes content does not match the fixed byte sequence; and
   returning a true value if the tail bytes content matches the fixed byte sequence.

4. The method of claim 1, further comprising:
   using SHA1, SHA2, or CRC32, to calculate a combined result from the user pointer, the user memory size, a reserved indicator, the allocation type, and some random bytes that are generated when the memory tracker starts;

selecting and copying multiple bytes of the calculated combined result into the tail bytes of the UMB; and performing a buffer overflow verification method that includes comparing a content of the tail bytes with the calculated combined result matches a value in the tail bytes of the UMB.

5. The method of claim 1, further comprising adjusting a length of the tail bytes based on system design requirements of the caller program.

6. The method of claim 1, further comprising:
verifying the tail bytes when releasing the blocks of memory;
determining whether the tail bytes are verifiable; and
Response and Amendment generating a buffer overflow report in response to the tail bytes not being verifiable.

7. The method of claim 1, further comprising generating memory leak reports if there are non-reserved AMBs in the AMT when the memory tracker is terminating.

8. The method of claim 1, further comprising using C and C++ provided macros _FILE_, _func_, and _LINE_ to set a memory allocation caller's source file information in the AMB.

9. The method of claim 8, further comprising defining macros to replace malloc, calloc, realloc, new, and new[ ] to combine the memory allocation and set caller source file information operations into a single logical programming line.

10. The method of claim 9, further comprising adding a compile time switch to let the memory tracker set a source code information for debug versions.

11. The method of claim 1, further comprising reporting a source code information of a memory allocation caller in response to an occurrence of a memory leak, a buffer overflow, or a release type mismatch error, wherein the memory allocation caller includes one or more of: a source file name, a function name, a line number, a process identification, a thread identification, and a timestamp.

12. The method of claim 1, further comprising providing event handler function pointers to allow user programs to create event handling programs to process memory allocate, release, buffer overflow, memory leak, and release type mismatch events.

13. The method of claim 1, further comprising providing a function to allow user programs to retrieve dynamic memory usage summary data.

14. The method of claim 1, further comprising providing an optional final memory usage summary report when the memory tracker terminates.

15. The method of claim 8, wherein the AMB includes: an indicator that shows whether the memory block is reserved or not; the memory allocation caller's source file information including a source file path, a function name, a line number, a process identification, a thread identification, and a timestamp.

16. The method of claim 1, wherein the AMB and the UMB are combined into one memory block or are separated into two memory blocks.

17. The method of claim 16, further comprising the user pointer in the AMB pointing to a beginning of the UMB user memory.

18. The method of claim 1, further comprising:
generating a section of bytes in the AMB representing a memory allocation type value, wherein the memory allocation type value indicates one of the release functions or operators in association with a request for a block of memory;
saving a request type value in association with an allocated block of memory;
determining, during a release of a block of memory, whether the request type value matches the memory allocation type value;
reporting a mismatch for the release of the block of memory in response to the request type value not matching the memory allocation type value; and
releasing the block of memory in response to the request type value matching the memory allocation type value.

* * * * *